United States Patent
Visuri et al.

(10) Patent No.: US 10,123,276 B2
(45) Date of Patent: Nov. 6, 2018

(54) SYSTEMS AND METHODS FOR OPTIMIZING MOBILE DEVICE RADIO MANAGEMENT FOR USER EXPERIENCE

(71) Applicant: BANDWIDTHX INC., Carlsbad, CA (US)

(72) Inventors: Pertti Juhani Visuri, Carlsbad, CA (US); Randy Salo, Carlsbad, CA (US); Christian Van Hamersveld, Carlsbad, CA (US); Johanna Katariina Visuri, Carlsbad, CA (US)

(73) Assignee: BANDWIDTHX INC., Carlsbad, CA (US)

( * ) Notice: Subject to any disclaimer, the term of this patent is extended or adjusted under 35 U.S.C. 154(b) by 0 days.

(21) Appl. No.: 15/540,796

(22) PCT Filed: Dec. 30, 2015

(86) PCT No.: PCT/US2015/068177
§ 371 (c)(1),
(2) Date: Jun. 29, 2017

(87) PCT Pub. No.: WO2016/109742
PCT Pub. Date: Jul. 7, 2016

(65) Prior Publication Data
US 2017/0374622 A1    Dec. 28, 2017

Related U.S. Application Data

(60) Provisional application No. 62/098,776, filed on Dec. 31, 2014.

(51) Int. Cl.
*H04W 52/02* (2009.01)
*H04W 24/02* (2009.01)
*H04W 48/20* (2009.01)

(52) U.S. Cl.
CPC ....... *H04W 52/0254* (2013.01); *H04W 24/02* (2013.01); *H04W 48/20* (2013.01);
(Continued)

(58) Field of Classification Search
CPC .................................................. H04W 52/054
See application file for complete search history.

(56) References Cited

U.S. PATENT DOCUMENTS 8,063,872 B2 * 11/2011 Forstall ................. G06F 1/3203
345/102
9,084,179 B2 *  7/2015 Visuri ................... H04W 48/16
(Continued)

OTHER PUBLICATIONS

International Search Report and Written Opinion for related PCT application No. PCT/US2015/068177, dated Apr. 28, 2016, in 11 pages.
(Continued)

*Primary Examiner* — Gregory B Sefcheck
(74) *Attorney, Agent, or Firm* — Procopio, Cory, Hargreaves & Savitch LLP (57) ABSTRACT

A system and method for managing radios of a wireless communication device are disclosed herein. The method can include controlling the radio based on the last selection of the user related to the state of the radio and on the state of the display of the wireless communication device. The method can also include turning the radio on when the user last turned the radio on and the display is turned on. The method can further include determining whether a radio connection is established and whether the radio connection is adequate when the user last turned the radio on and the display is turned off. The method can still further include leaving the radio on when the radio connection is adequate and turning the radio of for a determined interval when the radio connection is inadequate.

20 Claims, 4 Drawing Sheets

(52) U.S. Cl.
CPC .......... *Y02D 70/00* (2018.01); *Y02D 70/1224* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/164* (2018.01); *Y02D 70/23* (2018.01)

(56) References Cited

U.S. PATENT DOCUMENTS

| | | | |
|---|---|---|---|
| 9,110,671 B2 * | 8/2015 | Eckert | G06F 1/324 |
| 9,167,527 B2 * | 10/2015 | Song | H04W 52/0251 |
| 9,288,831 B2 * | 3/2016 | Visuri | H04W 48/16 |
| 9,345,059 B2 * | 5/2016 | Visuri | H04W 48/16 |
| 9,549,082 B2 * | 1/2017 | Visuri | H04M 15/80 |
| 9,578,674 B2 * | 2/2017 | Visuri | H04W 48/16 |
| 9,781,277 B2 * | 10/2017 | Seuken | H04M 15/80 |
| 9,826,464 B2 * | 11/2017 | Visuri | H04W 48/14 |
| 2007/0191069 A1 | 8/2007 | Matsumoto | |
| 2009/0098869 A1 | 4/2009 | Torrance et al. | |
| 2010/0167792 A1 * | 7/2010 | Chen | G06F 1/3203 455/566 |
| 2012/0315960 A1 * | 12/2012 | Kim | H04W 52/0254 455/574 |
| 2013/0196663 A1 | 8/2013 | Yurkevich et al. | |
| 2013/0223335 A1 | 8/2013 | Kwag et al. | |
| 2013/0322329 A1 | 12/2013 | Visuri et al. | |
| 2013/0322401 A1 * | 12/2013 | Visuri | H04W 48/16 370/331 |
| 2013/0345980 A1 * | 12/2013 | van Os | G01C 21/3626 701/538 |
| 2013/0345981 A1 * | 12/2013 | van Os | G01C 21/3626 701/540 |
| 2014/0051448 A1 | 2/2014 | Guo | |
| 2014/0105016 A1 | 4/2014 | Tsuda | |

OTHER PUBLICATIONS

Extended European Search Report for related EP Patent Application No. 15876311.0, dated Mar. 6, 2018, in 7 pages.

* cited by examiner

SYSTEMS AND METHODS FOR OPTIMIZING MOBILE DEVICE RADIO MANAGEMENT FOR USER EXPERIENCE

BACKGROUND

Technical Field

The subject matter discussed herein relates generally to wireless mobile devices and, more particularly, to optimizing mobile device management for such mobile wireless communication devices.

Related Art

As communication needs of various wireless and mobile devices have grown, many of them have been equipped with more than one radio system. Each of the radio systems is being used to connect to a particular type of wireless network. Examples of such systems are a cellular radio system that may be utilizing a GSM, CDMA or LTE standard for encoding the signal and a Wi-Fi system that utilizes a well-known IEEE 802.11 standard for communication. Another example would be a WiMAX system that is based on the IEEE standard 802.16.

In a communication device that has multiple radio systems each of the radios may have different characteristics. For example, the cellular system may be designed to connect to cell towers that are further apart and use a higher power signal than the Wi-Fi radio system uses. Since the Wi-Fi standard is utilizing unlicensed spectrum the power of the transmitter is limited by regulation and consequently the distance over which the communication can effectively take place in is typically shorter than the distance in the case of a cellular connection.

Since the device is utilized for communication in different environments and it may be used for different tasks at different times, it will be most advantageous to utilize a particular radio system at different times. Differences in the desirability of different systems may be due to the capabilities of the radio network, signal quality, the efficiency of encoding as a result of the relative signal strengths or may pertain to the cost of using a particular radio system. The cost is typically dependent on various agreements that the owner of the device may have with various service providers.

Operating each of the radio systems consumes resources of any mobile device. In particular, consumption of energy supplied by the battery system is a significant consideration. Therefore it is not advantageous to have radio systems active at a time when they do not provide any benefit. An example of such time would be operating a Wi-Fi radio system when there are no Wi-Fi access points within range or when all the access points that are within range are unavailable for connectivity because they require a password for a connection and such password is not available.

While it is, in principle, possible for the owner or user of the device to manually turn on and off various radio systems depending on the location of the device and the current use of the device for data communication, it is not practical. Users of the devices are typically focused on higher level tasks and other things in their life and cannot be expected to perfectly anticipate which radio system should be on and off for optimum use of resources, or to continuously pay attention and take action accordingly.

Often the users' choices of operating various radio systems cause unnecessary drain of the battery power. One example of such sub optimal power usage is a choice of leaving the Wi-Fi radio in the mobile device on all the time. In this case it may automatically frequently scan in order to find an available Wi-Fi access points for connection. Such a scan includes receiving a set of beacon packets from nearby access points and decoding their content to identify the access points that transmitted the packets.

Another example of a sub optimal use of power is the choice of leaving the Wi-Fi radio completely off in order to avoid the battery consumption described in the previous example. In this case the device needs to use the cellular or other radio systems for all communication needs. Often communicating to the more distant cellular tower it consumers more battery power than it would consume to communicate to a local Wi-Fi access point. The higher battery consumption could be resulting from a need to use higher power to reach the more distant cellular tower or from the fact that a potentially lower signal-to-noise ratio in the cellular signal requires a less efficient encoding choice for sending the data than would be necessary for a similar communication to a local Wi-Fi access point. With the less efficient encoding it will take much longer to send the same amount of data and therefore the radio has to be transmitting and consuming power for a longer time.

Various time of day or location-based automation systems have been proposed to make up for the user's lack of attention. These systems would, for example, turn the Wi-Fi radio on and off based on a preprogrammed schedule or based on a detected location of the device. These kinds of systems can provide some improvement but, given the varying operating environment and use of wireless communication devices, they are far from optimal in managing the radio system.

SUMMARY

A method for managing a radio of a wireless communication device is disclosed herein. In embodiments, the method includes determining a last selection of a user related to an operation state of the radio and monitoring a display of the wireless communication device. The method also includes turning the radio on when the last selection of the user related to the operation state of the radio turned the radio on and the display of the wireless communication device changes to an active state. The method further includes determining whether a radio connection is established and whether the radio connection quality is adequate to route data traffic therethrough when the last selection of the user related to the operation state of the radio turned the radio on and the display of the wireless communication device changes to an inactive state. The method yet further includes leaving the radio on when the radio connection established is adequate to route data traffic therethrough, the display is inactive, and the last selection of the user related to the operation state of the radio turned the radio on. The method still further includes turning the radio off until the expiration of a wake up interval when the radio connection established is inadequate to route data traffic therethrough, the display is inactive, and the last selection of the user related to the operation state of the radio turned the radio on. The method further includes turning the radio on after the expiration of the wake up interval and checking for an adequate radio connection, leaving the radio on if an adequate radio connection is established and turning the radio off until the expiration of the wake up interval if the radio connection is inadequate.

In embodiments, the method also includes checking for an adequate radio connection when the last selection of the user related to the operation state of the radio turned the radio off and the display of the wireless communication device changes to the active state, leaving the radio on when the radio connection established is adequate to route data traffic therethrough, and turning the radio off when the radio connection established is inadequate to route data traffic therethrough. The method may also include turning the radio on and checking for an adequate radio connection when the last selection of the user related to the operation state of the radio turned the radio off and the display of the wireless communication device changes to an inactive state. The method may further include leaving the radio on when the radio connection established is adequate to route data traffic therethrough, the display is inactive, and the last selection of the user related to the operation state of the radio turned the radio off. The method may yet further include turning the radio off until the expiration of the wake up interval when the radio connection established is inadequate to route data traffic therethrough, the display is inactive, and the last selection of the user related to the operation state of the radio turned the radio off. The method may still further include turning the radio on after the expiration of the wake up interval and checking for an adequate radio connection, leaving the radio on if an adequate radio connection is established and turning the radio off until the expiration of the wake up interval if the radio connection is inadequate.

DETAILED DESCRIPTION

The systems and methods disclosed herein include radio management automation for one or more radios of a wireless communication device for optimizing the user experience and optimizing usage of the one or more radios. In embodiments, the method can include controlling the radio based on the last selection of the user related to the state of the radio and on the state of the display of the wireless communication device. The user experience can be optimized by presenting the user with the state of the radio that the user previously selected while the display is active, while still optimizing the usage of the radio using an automated control of the radio while the display is turned off.

Figure 1:
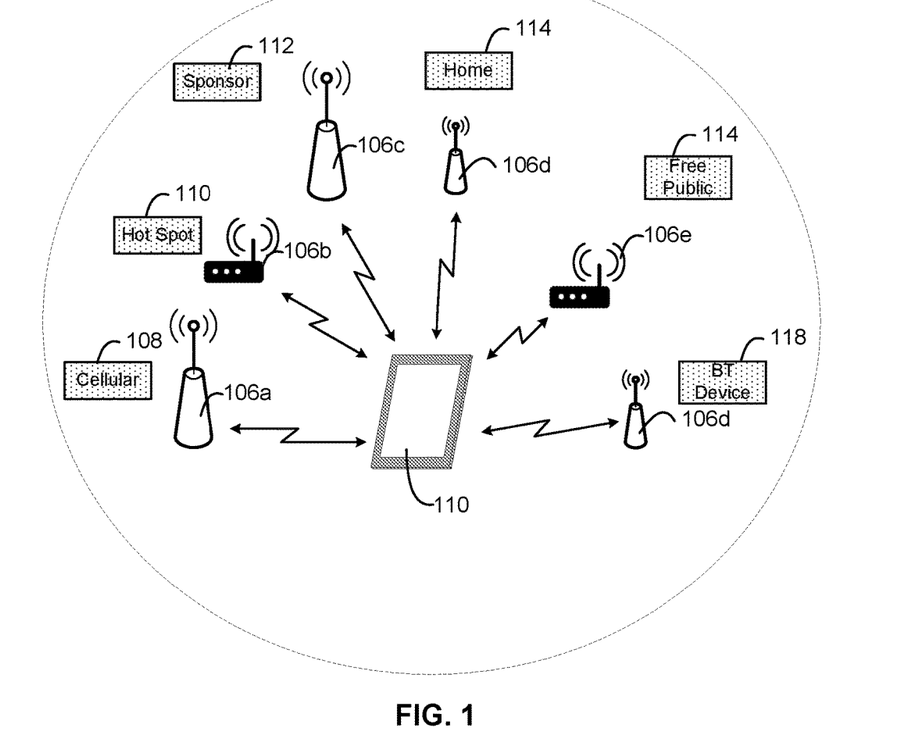
FIG. 1 is a functional block diagram of a system for providing network access to a mobile device.

FIG. 1 is a functional block diagram of a system for providing network access (system) 100 for a mobile device (device) 102. The mobile device (device) 102 can be a mobile electronic terminal, capable of wireless communications via one or more wireless services to, for example, one or more other devices 102. The device 102 can also be referred to herein as a user equipment (UE), a mobile station (MS), or mobile terminal (MT). The device 102 can be a cellular phone or other mobile electronic communication system capable of communications over one of several communication standards, such as 2G (e.g., GSM, GPRS, EDGE, iDEN, TDMA, CDMA), 3G (e.g., CDMA2000, 1×-EVDO, P25-LMR, WCDMA, UMTS, HSPA), 4G (e.g., LTE, WiMAX), VoIP, IMS, IPTV, WLAN, Wi-Fi (e.g., one or more of the family of IEEE 802.11 standards), Bluetooth, and other radio-based wireless protocols, to communicate with another mobile device 102 or a remote device such as for example, a Bluetooth keyboard, headset, or other accessory. In some examples, the device 102 can communicate via one or more communication services facilitated by a cellular tower or base station of a cellular network. The cellular standards can be one or more of 2G, 3G, 4G, Long Term Evolution (LTE), LTE-Advanced, GSM, GPRS, CDMA, or another wireless standard known in the art. However, it should be understood that the same mechanisms and principles can be used to implement the system 100 and connection selection functions for any other radio system (e.g., Bluetooth and Wi-Fi) as well. For convenience, LTE and Wi-Fi may be referred to herein as exemplary standards for use with the system 100.

The device 102 can participate in communication via one or more different communication systems over multiple communication standards simultaneously. For example, the device 102 can have an LTE connection with a cellular provider 108 for a telephone conversation, a Bluetooth connection to a wireless headset, such as a Bluetooth (BT) enabled device 118, while also receiving email via an 802.11 connection with a local Wi-Fi hotspot 110.

The wireless services can be provided via one or more access points (AP) 106. The access points 106 are depicted as APs 106a-106f, but may collectively be referred to herein as APs 106. The APs 106 may also be referred to herein individually as the AP 106. The APs 106 can be implemented to provide a variety of wireless services. For example, the cellular provider 108 can have an AP 106a to provide cellular (e.g., LTE) service. An AP 106b can be used as a stationary or mobile Wi-Fi hotspot 110. An AP 106c can be operated by sponsor 112, such as a small-scale network operated by a vendor. An AP 106d can be a pico cell or a home network 114. An AP 106e can be implemented to provide free public Wi-Fi 116 connections, at for example, an airport. An AP 106f can also be implemented as a Bluetooth (BT) device 118, such as a speaker or wireless headset.

Figure 2:
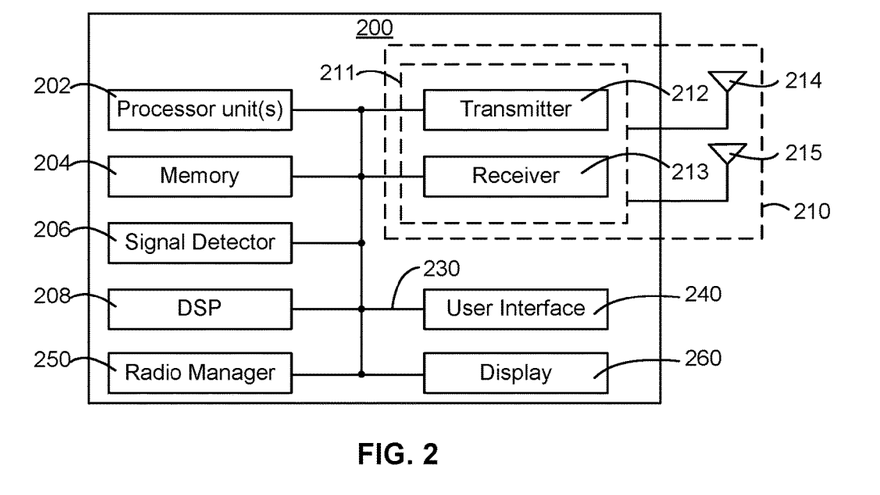
FIG. 2 is a functional block diagram of a wireless communication device that can be employed within the wireless communication system of FIG. 1.

FIG. 2 is a functional block diagram of a wireless communication device 200 that can be employed within the wireless communication system 100 of FIG. 1. The wireless communication device 200 is an embodiment of a device that can be configured to implement the various methods described herein. For example, the wireless communication device 200 can include the device 102 or one or more of the APs 106.

The wireless communication device 200 can include one or more processors or processor units 202, which controls operation of the wireless communication device 200. The processor 202 can also be referred to as a central processing unit (CPU). The wireless communication device 200 can also have a memory 204 coupled to the processor 202. The memory 204 can include both read-only memory (ROM) and random access memory (RAM). The memory 204 can provide instructions and data to the processor 202. At least a portion of the memory 204 can also include non-volatile random access memory (NVRAM). The processor 202 can performs logical and arithmetic operations based on program instructions stored within the memory 206. The instructions in the memory 204 can be executable to implement the methods described herein.

The processor 202 can include or be a component of a processing system implemented with one or more processors

202. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system can also include machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The wireless communication device 200 can also include multiple radio systems 210, such as a cellular radio system, a Wi-Fi radio system, and a Bluetooth radio system. For ease of explanation, only a single radio system 210 is shown. The radio system 210 can include a transmitter 212 and/or a receiver 213 to allow transmission and reception of data between the wireless communication device 200 and a remote location, such as through an access point 106 of FIG. 1. The transmitter 212 and the receiver 213 can be combined into a transceiver 211.

Each of the radio systems 210 can be capable of communications over one or more communication standard, such as 2G (e.g., GSM, GPRS, EDGE, iDEN, TDMA, CDMA), 3G (e.g., CDMA2000, 1x-EVDO, P25-LMR, WCDMA, UMTS, HSPA), 4G (e.g., LTE, WiMAX), VoIP, IMS, IPTV, WLAN, Wi-Fi (e.g., one or more of the family of IEEE 802.11 standards), Bluetooth, and other radio-based wireless protocols, to communicate with other wireless communication devices 200, such as mobile devices 102 and APs 106.

The wireless communication device 200 can also have one or more antennas 214, 215 associated with the radio system 210. The associated antennas 214, 215 are electrically coupled to the transceiver 214. The wireless communication device 200 can also include (not shown) multiple transmitters, multiple receivers, multiple transceivers, and/or multiple antennas, each of which can be part of one or more radio system 210 as needed for various communication standards.

The transmitter 212 can be configured to wirelessly transmit packets having different packet types or functions. For example, the transmitter 212 can be configured to transmit packets of different types generated by the processor 202. When the wireless communication device 200 is implemented or used as one or the APs 106 or the device 102, the processor 202 can be configured to process packets of a plurality of different packet types. For example, the processor 202 can be configured to determine the type of packet and to process the packet and/or fields of the packet accordingly. When the wireless communication device 200 is implemented or used as one of the APs 106, the processor 202 can also be configured to select and generate one of a plurality of packet types. For example, the processor 202 can be configured to generate a discovery packet including a discovery message and to determine what type of packet information to use in a particular instance.

The receiver 208 can be configured to wirelessly receive packets having different packet types. In some examples, the receiver 208 can be configured to detect a type of a packet used and to process the packet accordingly.

The wireless communication device 200 can also include a signal detector 206 that can be used in an effort to detect and quantify the level of signals received by the transceiver 211. The signal detector 206 can detect such signals as total energy, energy per subcarrier per symbol, RSSI, SNR, power spectral density, and other signals pertaining to the factors described above. The wireless communication device 200 can also include a digital signal processor (DSP) 208 for use in processing signals. The DSP 208 can be configured to generate a packet for transmission.

The wireless communication device 200 can further include a user interface 240. The user interface 240 can include a keypad, a microphone, a speaker, and/or a display 260. The user interface 240 can include any element or component that conveys information to a user of the wireless communication device 200 and/or receives input from the user. For example, the user may use the user interface 240 to turn on and off the various radio systems 210 or he may use it to make the selection to automate control of the radio systems 210.

The various components of the wireless communication device 200 can be coupled together by a bus system 230. The bus system 230 can include a data bus, for example, as well as a power bus, a control signal bus, and a status signal bus in addition to the data bus. The components of the wireless communication device 200 can be coupled together or accept or provide inputs to each other using some other mechanism.

Although a number of separate components are illustrated in FIG. 2, one or more of the components can be combined or commonly implemented. For example, the processor 202 can be used to implement not only the functionality described above with respect to the processor 202, but also to implement the functionality described above with respect to the signal detector 206 and/or the DSP 208. In some embodiments, each of the components illustrated in FIG. 2 can be implemented using a plurality of separate elements.

The wireless communication device 200 including the operating system and applications executing in the processor 202 may have communication needs. The operating system and applications may use the radio systems 210 for this communication.

The wireless communication device 200 may also include a radio manager 250, which may determine which radio system(s) 210 will be used for the communication. The radio manager 250 can be implemented by the processor unit 202. The wireless communication device 200 may utilize a particular radio system 210, for example the Wi-Fi radio, for data communication needs if a connection to the Internet can be established through that radio system 210.

In order for the wireless communication device 200 to utilize a particular radio system 210, the specific radio system 210 needs to be turned on. The radio system 210 can either be turned on and off by the user through the user interface 240 or be automatically turned on and off by the radio manager 250, which may be an application that controls the state of the radio(s) 214, 215 executed in the processor 202. The radio manager 250 may be configured to optimize the radio systems 210. This optimization may be based on the amount of data being transferred, the current data transfer speeds, the data communication locations, previous radio system 210 usage, performance characteristics of the radio systems 210, cost, other factors, or a combination of factors.

For clarity the following examples of managing the radio systems 210 are written to illustrate the management of the Wi-Fi radio system, each of which can be implemented by the radio manager 250. However, it should be understood that the same mechanisms and principles can be used to manage the state of any other radio system 210 as well.

In many devices for wireless communication it is customary to have the cellular radio system on all the time whether it is the conventional 2G or 3G or 4G radio or a packet-based LTE radio. This system handles the communication with the mobile service provider including voice calls and text messages. If there is no other radio systems available the cellular radio system also handles any data communication that the device may require. However, in many cases the data communication is automatically switched over to the Wi-Fi system if a connection to the Internet or other backend system is available through the Wi-Fi radio. This is because in most cases it is less costly and uses less battery power to send the data communications over the Wi-Fi system. The use of the Wi-Fi radio may reduce cost, offload data traffic from a mobile service provider's network whenever it is advantageous, and may help optimize the mobile service provider's network.

In one embodiment, the radio manager 250 periodically checks the amount of data that is being transferred, or needs to be transferred, through the radio systems 210. If the amount of data transmitted over a particular time interval exceeds a predetermined value the radio manager 250 turns on the Wi-Fi radio. Stated in a different way: if the speed of data transmissions exceeds a predetermined threshold, the system turns on the Wi-Fi radio.

Referring to FIGS. 1 and 2, when the Wi-Fi radio is turned on it will scan the environment to see what, if any, Wi-Fi access points 106 are available and whether they require a password or other credentials for a connection. If there is an available access point 106 or several access points 106, the wireless communication device 200 will connect to one of them if the device has information of any passwords that may be required for a connection.

Connecting to the Wi-Fi access point 106 may not mean that there is a connection to the Internet. The device checks whether the connection is available, for example by requesting a specific website to provide a response and then comparing the received response to a stored copy of the expected response. This way the system can determine whether any access control gateway has redirected to a connection to a page that may require input of credentials.

The radio manager 250 may continue to monitor data traffic and if it detects that the speed of the traffic falls below a certain predetermined threshold for a predetermined time it will turn off the Wi-Fi radio. In another embodiment the radio manager 250 would leave the Wi-Fi radio on as long as the wireless communication device 200 maintains a connection with the access point 106 and the signal strength, or the signal-to-noise ratio in the connection to the Wi-Fi access point 106 stays above a predetermined threshold. If the connection signal strength or other quality indicator falls below a predetermined value the radio manager 250 will disconnect and turn off the Wi-Fi radio.

In another embodiment radio manager 250 keeps track of the active applications running in the wireless communication device 200 and as soon as an application that has significant communication needs is activated, the radio manager 250 will automatically turn on the Wi-Fi radio. This initiates another scan of the environment and, as explained above, possibly a connection through a Wi-Fi access point 106. A list of applications that may have significant communication needs is in this case stored in the memory 204. For example, the list can be preconfigured by a user or can be determined automatically by the radio manager 250 over time by monitoring the data usage and patterns of use of various applications and previous configurations selected by the user.

Another indication of possible data communication needs is the overall state of the wireless communication device 200 and the state of its display 260. In order to conserve battery power the wireless communication device 200 automatically goes into a "sleep" mode, in which the display 260 may be turned off, and any other processes and device may be suspended. During these times the radio manager 250 may turn the Wi-Fi radio off and adjust the so-called wake-up interval as explained later in this description.

In addition to keeping track of the data communication speeds and the applications that may have data communication needs the radio manager 250 may use the observed current and a set of previous locations of the wireless communication device 200 for making the decisions about turning on and off the radio systems 210 and the radios 214, 215.

In one embodiment, radio manager 250 stores the locations of data communication in the memory 204, the radio system 210 used for the data communication, the total amount of data in each communication session, the duration of the session, and the application using data communications. The radio manager 250 uses this information to learn the locations where significant data communication takes place and where a Wi-Fi radio connection (or any other particular radio system) is used for this communication. The radio manager 250 may organize the locations based on data usage. The radio manager 250 may also organize the locations based on the percentage of successfully using Wi-Fi. The radio manager 250 may use the top locations in the ranking as a basis for turning on Wi-Fi or shortening the wake-up interval. The radio manager 250 may also automatically turn on the Wi-Fi radio whenever it detects the wireless communication device 200 is in a location or within a certain distance of a location where communication over the Wi-Fi radio system was previously successfully used.

In order to avoid the drain on the battery from using the GPS system the radio manager 250 may first try to establish the location of the wireless communication device 200 based on methods using cellular radio stations or access points 106 for Wi-Fi or other radio systems that it detects during routine scans and operation, such triangulation. The frequency of the location checks and the method of checking the location may be selected based on previous radio system 210 usages, such as the past history of the frequency of data communications or other parameters characterizing previous data communications including the time of day and day of the week of previous data communications.

The wireless communication device 200 may be in motion while the data use is ongoing, for example in a moving vehicle. In these instances, the opportunity to utilize Wi-Fi connections may be limited because of the time required to establish a new connection and the limited amount of the time any particular Wi-Fi access point 106 would be available for the connection. When motion is detected beyond a given threshold speed, the radio manager 250 may increase the wake up interval, or may turn off the Wi-Fi radio system or radio(s).

In addition to data communication needs and observed locations of data communication, the radio manager 250 may use time based methods for managing the radio systems 210. The radio manager 250 may develop a schedule for when to turn on and off the radio systems 210. This schedule may be based on the previous radio system 210 usages, the pattern of observed behavior regarding data communications, user inputs, or other observed behaviors.

The radio manager 250 may periodically turn a radio system 210, such as the Wi-Fi radio system. For example, upon turning on the Wi-Fi radio the wireless communication device 200 performs a fairly rapid scan of the environment and determines whether there are any access points 106 that are available for a connection. If there are, the Wi-Fi radio system will associate with the access point(s) 106 and may remain associated with the access point(s) 106 until signal quality degradation results in a disassociation. Upon disassociation the radio manager 250 will turn the Wi-Fi radio off. If there are not any access points 106 through which the wireless communication device 200 can establish a Wi-Fi connection, the radio manager 250 will automatically turn off the Wi-Fi radio for a set amount of time, which we will call "the wake-up interval".

Along with turning on and off the radio systems 210 or one or more of their associated radios, such as transmitters 212 and receivers 213, the radio manager 250 may also modify the length of the wake-up interval. For example, during times of day and days of the week that the wireless communication device 200 previously had frequent and high-volumes of data communication the wake-up interval may be shortened.

The length of the wake-up interval may depend on the overall state of the wireless communication device 200 and the current state of its display 260. If the device is in so-called sleep mode the wake-up interval may be lengthened. A status change from sleep mode to normal operating mode may trigger an immediate turning on off the radio and a scan of the environment for Wi-Fi access and a shortening of the wake-up interval if no access points 106 are found that can provide a Wi-Fi connection.

In Wi-Fi access point connections the signal strength and quality may depend on a number of factors including the distance to the access point 106, the way the user is holding the wireless communication device 200 and interference from other devices like microwave ovens. In these cases the availability of a connection may disappear for a short period of time and return as the circumstances change. For this reason, the radio manager 250 may utilize a short wake-up interval for the first couple of connection attempts after a disconnection and then may increase the wake-up interval in accordance with the device situation data use and other parameters if a connection is not made.

A user may be able to configure when the wireless communication device 200 performs tasks and the applications to execute instructions when there is a Wi-Fi connection to the Internet or a backend system. For example, the user may configure the wireless communication device 200 to only upload photographs to a cloud system, synchronize podcasts or other content, or download software updates over a Wi-Fi connection. The wake-up interval may be determined so that it is likely that these tasks will get completed within a time expected by the user after he or she arrives at a location where Wi-Fi is available. Without a wake-up interval and time based Wi-Fi radio management these tasks might not get completed even though a Wi-Fi connection would be available.

The radio manager 250 may also utilize the performance characteristics of the radio systems 210 and any associated systems to determine how to control the radio systems 210 including their associated radios. These performance characteristics may include the relative signal strengths, the automatically selected encoding rates for each radio communication alternative, and the relative battery consumption of various radio systems or any other metric that is available to the radio manager 250. The radio manager 250 may perform periodic checks of the performance levels.

The radio manager 250 may perform brief speed tests with various radio systems 210 and have logic that determines that a certain available speed level in each of the radio systems 210 will cause the connection to be switched over to that radio system 210. Other characteristics of relative performance may be measured which may result in a more complex logic for selecting which radios to use and which ones to turn off and how long the wake-up intervals should be for the radios systems 210 or their associated radios that have been turned off. Further management of the radio systems 210 and their associated radios was described in U.S. patent application Ser. No. 13/684,049 filed on Nov. 21, 2012, and titled MOBILE DEVICE RADIO MANAGEMENT, which is hereby incorporated by reference.

In some embodiments of the solution the Wi-Fi radio or other radio systems may have predetermined or known costs associated with data communication over the radio link.

In case the cost of communication is known or can be determined, it can be used to select the communication link between different alternatives. These alternatives may include multiple Wi-Fi access points and cellular radio, WiMAX and other radio systems. In one embodiment of the solution the selection of the connection to be used is based on the cost and possibly by a policy provided by either the device owner or the communication service provider that is providing the cellular communication to the device and has a contract with the device owner.

In case a certain radio system 210 is not selected for communication the radio manager 250 may automatically turn off the radio system 210 or its associated radios in order to save battery power. The radio manager 250 may set the wake-up interval based on time location and history of communication.

The radio manager 250 may use any combination of the factors described herein to manage the state of each radio system 210 of the wireless communication device 200 and in managing the selection of a specific communication link. The radio manager 250 may utilize these combinations to achieve optimum management of the radio resources with regard to battery power and cost. For example the wake-up interval can be set to be different at different times of the day and at different locations of the device and may depend on which applications are active in the wireless communication device 200.

Similarly, the wake-up interval may depend on the past success in establishing a Wi-Fi connection in a particular location. For example, if the wireless communication device 200 has tried a few times to find an available access point 106 for a Wi-Fi connection in a particular location and failed, the radio manager 250 may make the wake-up interval longer in that location to avoid unnecessary connection attempts. For example, the wake-up interval for that location may be made to be a day or several days so that the wireless communication device 200 will catch a possible addition of a new access point 106 that may be made available, but will not waste resources in trying to connect frequently in places where no connection has been available before. Access points 106 may be available for a particular device because they do not have a password protection or access control gateways controlling access to the Internet, because the password has been stored in the memory of the device or because they can be accessed through an alternative network access provider.

Figure 3:
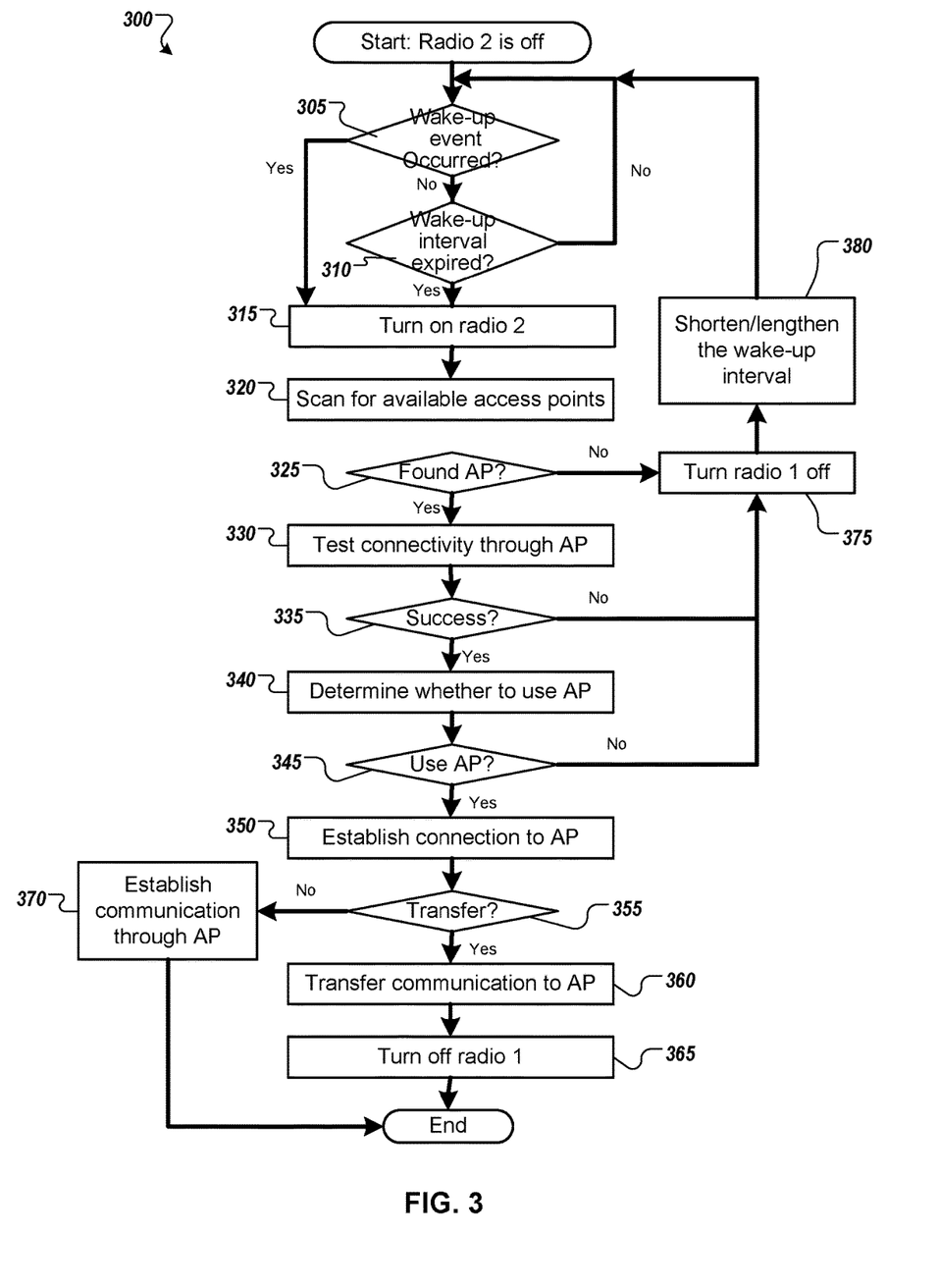
FIG. 3 shows an example process for managing radios.

FIG. 3 shows an example process for managing radios. The process may be implemented by the radio manager 250 to manage radio(s) of the wireless communication device 200, such as transceivers 211. This example is illustrated with two radios (e.g., radios 1 and 2). However, an implementation may include three or four or more radios. When radio 1 is on and radio 2 is off, process 400 may be used to manage the radios (e.g., manage the on/off stages of the radios) to, for example, minimize power consumption. In this example, process 300 starts with radio 2 being off. At decision block 305 the radio manager 250 determines if a wake-up event has occurred. A wake up event may be triggered, for example, if a specific application is being executed, the throughput of radio 1 is above a high threshold or below a low threshold, the quality of an existing connection with radio 1 has deteriorated (e.g., a low signal to noise ratio), the location of the device has changed, etc. If a wake-up event has occurred, process 300 flows to block 315 where radio 2 is turned on. If a wake-up event has not occurred, the radio manager 250 determines if a wake-up interval has expired at decision block 310. When the wake-up interval has expired, the radio manager 250 turns on radio 2 at block 315. If not, process 300 loops back to decision block 305.

After radio 2 is turned on, the radio manager 250 directs radio 2 to scan for available connectivity access (e.g., available access points) at block 320. If connectivity access is found at decision block 325, the radio manager 250 directs radio 2 to perform a connectivity test at block 330. Just because an access point is available does not guarantee that the access point can connect to a desired source (e.g., on the Internet). The connectivity test may be a simple "ping" command to a known destination, an access to a known website, or in another manner to establish that an end-to-end connection is likely to succeed, as determined in decision block 335, using the access point found at block 320.

At block 340, the radio manager 250 determines whether to use the found access point. The determination can be made, for example, bases upon one or more access conditions (e.g., costs, capacity, speed, etc.) as described above. If the determination is positive at decision block 345, the radio manager 250 establishes a connection with the found access point at block 350. If the new connection using radio 2 is made to replace an existing connection (e.g., using radio 1), as shown in decision block 355, then the communication using radio 1 is to be transferred to radio 2 at block 360. After the communication is transferred from radio 1 to radio 2, the radio manager 250 may turn radio 1 off or put radio 1 in a power-save mode at bock 365 to conserver power. If the existing communication using radio 1 is not to be transferred, the radio manager 250 uses the connection established with radio 2 in parallel with the existing connection using radio 1, for example, to speed up the communication on radio 1 or for new communication. When a communication on any of the radios has come to an end, the radio manager 250 may turn off that radio or put that radio in a power-save mode and process 300 flows back to block 305.

If the result at decision block 325, 335, or 345 is "No," process 300 flows to block 375, where the radio manager 250 turns radio 1 off or puts radio 1 in a power-save mode. The radio manager 250 may then lengthen or shorten the wake-up interval, at block 380, as described above. After which the process 300 flows back to block 305.

In some examples, process 300 may be implemented with different, fewer, or more blocks. Process 300 may be implemented as computer executable instructions, which can be stored on a medium, loaded onto one or more processors of one or more computing devices and mobile devices, and executed as a computer-implemented method.

When the management of the radio system(s) is included in functions of a device that may not previously have had such functions, there is a possibility of confusion by the user of the device. For example, seeing that the Wi-Fi radio has been automatically turned on just after the end user had turned it off may cause concern that unnecessary battery drain is taking place because of such automation. Even in cases of a new device that is replacing a previous device it may be confusing to the device user to see that various radio systems are being turned on and off automatically.

This creates a need to communicate to the device's user how radio management works and improves performance. However, the end user may not be inclined to receive such communications. The confusion can be dramatically reduced and most of the benefits of automatic radio management can still be realized by using a "follow the user" radio management method.

In embodiments, the radio manager 250 writes into the memory 204 accessible by the radio manager 250 the last action that the user of the wireless communication device 200 made relative to the radio, such as turning the radio on or turning the radio off utilizing the user interface 240. The radio management then depends on whether the user last turned the radio, such as transceiver 211, on or off.

Figure 4:
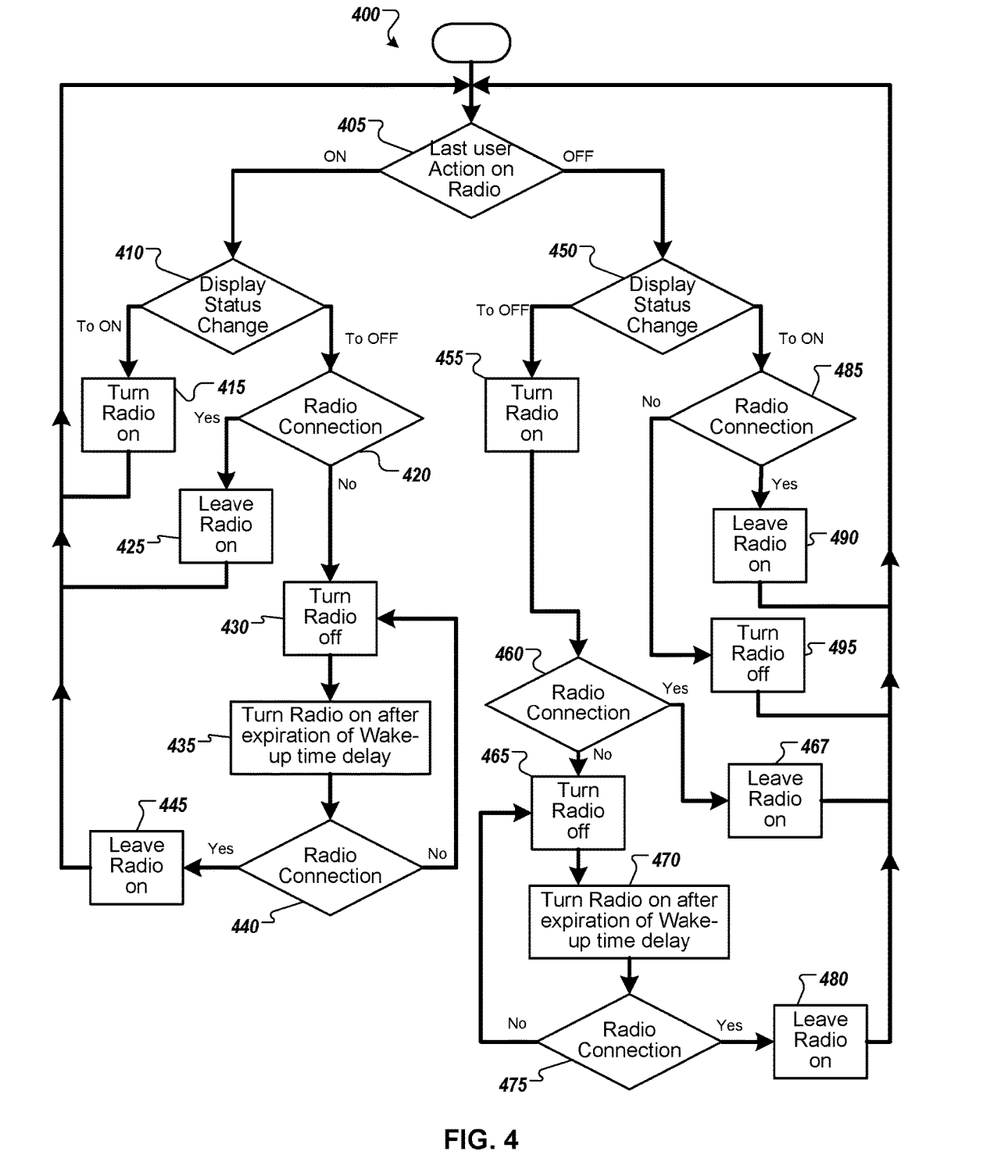
FIG. 4 shows another process for managing radios.

FIG. 4 shows another process 400 for managing radios. The process 400 may be implemented by the radio manager 250 to manage radio(s) of the wireless communication device 200, such as transceivers 211, in a "follow the user" radio management method.

Process 400 starts at decision block 405 where the radio manager 250 determines the last action taken by the user related to the radio, such as by checking the memory 204 for the last action of the user written to the memory 204. The last action of the user may be a selection by the user related to the operation state of the radio, such as turning the radio on or off. If the user last turned the radio on, process 400 flows to decision block 410 where the radio manager 250 monitors the display 260 for a change in the state of the display 260. When the display status changes to on, such as to an active state, the radio manager 250 turns the radio on while the display 260 is active and showing the user interface 240, such as when the user starts using the wireless communication device 200 and wakes it up from a power saving sleep state. In some embodiments, the radio manager 250 turns the radio on and leaves the radio on the entire time the display 260 remains active.

When the display status changes to off, such as to an inactive state, sleep mode, or low power mode, process 400 flows to decision block 420. At decision block 420 the radio manager 250 determines whether the radio has established a radio connection with an access point and determines whether the radio connection is adequate to route data traffic therethrough. The radio manager 250 may determine the adequacy of the radio connection using various methods disclosed herein or using other methods known in the art. The radio manager 250 may perform similar tests every time a determination about a radio connection is made. If the radio connection is sufficient, then the process 400 flows to block 425 and the radio manager 250 leaves the radio on while the display 260 is off. If a sufficient radio connection is not found then the process 400 flows to block 430 and the radio manager 250 turns the radio off.

After the radio is turned off the process flows to block 435 where the radio manager 250 turns the radio on after the expiration of a wake-up interval. Once the radio is turned on the process flows to decision block 440 where the radio manager 250 scans for a radio connection. If a sufficient radio connection is found, then the process 400 flows to block 445 and the radio manager 250 leaves the radio on while the display 260 is off and the connection remains established. If a sufficient radio connection is not found then the process 400 loops back to block 430 and the radio manager 250 turns the radio off until the expiration of the wake-up interval.

If the user last turned the radio off, process 400 flows from decision block 405 to decision block 450 where the radio manager monitors the display 260 for a change in the state of the display 260. When the display 260 status changes to off, process 400 flows to block 455 where the radio manager 250 turns the radio on and process 400 flows to decision block 460. At decision block 460 the radio manager 250 scans for a radio connection. If a sufficient radio connection is found, then the process 400 flows to block 467 where the radio manager leaves the radio on while the display 260 is off and the connection remains established. If a sufficient radio connection is not found then the process 400 flows to block 465 where the radio manager 250 turns the radio off.

After the radio is turned off the process flows to block 470 where the radio manager 250 turns the radio on after the expiration of the wake-up interval. Once the radio is turned on the process flows to decision block 475 where the radio manager 250 scans for a radio connection. If a sufficient radio connection is found, then the process 400 flows to block 480 where the radio manager leaves the radio on while the display 260 is off and the connection remains established. If a radio connection of sufficient quality is not found then the process 400 loops back to block 465 where the radio manager turns the radio off until the expiration of the wake-up interval.

In the embodiment illustrated, when the display status changes to on after the last user action turned the radio off, the process flows to decision block 485 where the radio manager 250 determines whether the radio has established a radio connection with an access point and determines whether the radio connection is adequate, or has recently been adequate, to route data traffic therethrough. If the radio connection is sufficient, then the process 400 flows to block 490 and the radio manager 250 leaves the radio on. If a sufficient radio connection is not found then the process 400 flows to block 495 where the radio manager 250 turns the radio off. In other embodiments, when the display 260 status changes to on after the last user action turned the radio off, the radio manager 250 turns the radio off if the radio is on. In this case the user is never surprised at the state of the radio, but the benefit of the alternative network is available only during the times the display is off.

In some examples, process 400 may be implemented with different, fewer, or more blocks. Process 400 may be implemented as computer executable instructions, which can be stored on a medium, loaded onto one or more processors of one or more computing devices and mobile devices, and executed as a computer-implemented method.

In some embodiments, usage of the Wi-Fi radio or other radio systems 210 may have known costs associated with data communication over the radio link. These costs may be known through a bandwidth exchange, such as the one described in U.S. patent application Ser. No. 13/684,048, filed on Nov. 21, 2012, titled MOBILE WIRELESS DEVICE WITH INTELLIGENT NETWORK ACCESS SELECTION, which is hereby incorporated by reference. In case the cost of communication is known, the cost can be used in decision blocks 420, 440, 460, 475, or 485 to make a decision about whether a radio connection is sufficient and about leaving the radio on. In one embodiment, whether to use the radio and turn the radio on is based on the cost of using the radio connection and by a policy provided by either the device owner or by the communication service provider who is providing the cellular communication to the device and has a contract with the device owner.

Process 400 may be used to manage any of the radios and radio systems 210 of the wireless communication device 200. In embodiments, the process 400 is used to control the Wi-Fi radio(s) and the Wi-Fi radio system(s). The radio manager 250 may implement process 400 in conjunction with process 300 and other methods for managing and controlling the radios and radio systems 210 of the wireless communication device 200. For example, the determination whether a radio connection is sufficient made at decision blocks 420, 440, 460, 475, and 485 of process 400 may be controlled or bypassed by process 300. For example, if the radio manager 250 is using process 400 to manage radio 1 and the radio manager used process 300 to turn radio 1 off in favor of the radio connection established with radio 2, then the radio manager 250 will leave radio 1 off. However, the radio manager 250 may override process 300 at decision block 410 of process 400 when the display 260 is turned on so that the end user will see radio 1 on when the user's last selection was to turn radio 1 on.

Managing one or more radios using process 400 may help end or reduce confusion of the user, such as the Wi-Fi radio, while realizing the benefits of managing the radio(s) using other processes, such as process 300.

Figure 5:
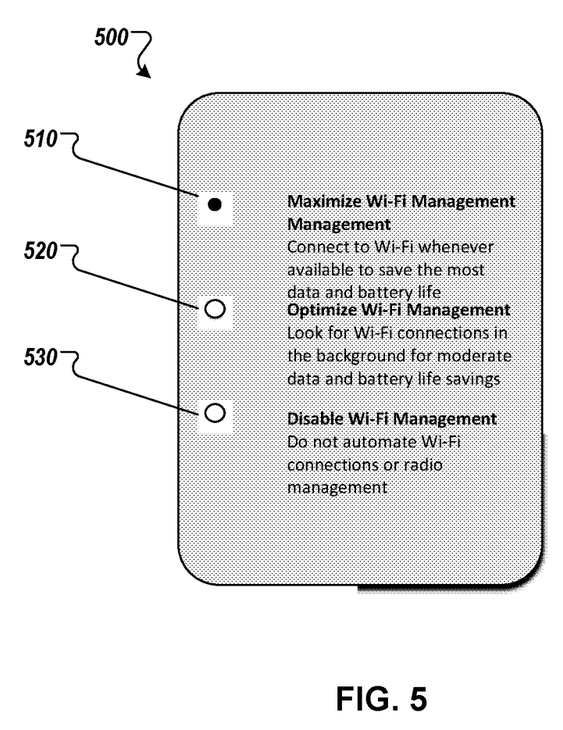
FIG. 5 is an exemplary illustration of an interface for selecting between levels of Wi-Fi management.

The wireless connection device 200 may provide various levels of radio control automation. For example, the radio manager 250 may display each level of automation on the display 240 and allow the user to make a selection of which level of automation to use, such as selections to maximize radio management, optimize radio management, or to disable radio management. FIG. 5 is an exemplary illustration of the interface 500 for selecting between levels of Wi-Fi management. The interface 500 may be part of the user interface 240 and may be shown on display 260. In the embodiment shown, the interface 500 includes a maximize selection 510, an optimize selection 520, and a disable selection 530. The maximize selection 510 may be aggressive in searching for Wi-Fi connections. When the maximize selection is made, the radio manager 250 may turn the Wi-Fi radio on when the display 260 is turned on regardless of the last user action. However, the radio manager 250 turns the Wi-Fi radio off if a sufficient connection cannot be found. When the optimize selection 520 is made the radio manager 250 uses process 500 to control the Wi-Fi radio. The radio manager may also use the other processes and methods described herein to optimize radio management of the wireless communication device 200 when the optimize selection 520 is made. When the disable selection 530 is made the radio manger 250 completely disables automation of the Wi-Fi radio(s) and gives the user complete control over the usage of the Wi-Fi radio(s). The radio manager 250 may use other combinations of automated control of the various radios used in the wireless communication device 200. Each combination may be presented to the user as a choice for selection, such as in the interface 600.

Providing the user with various radio management options may help inform the user of the automation of the radios and of the benefits of the automation, and may eliminate any confusion, negative reaction or sense of losing control of the wireless communication device 200.

The earlier sections of this application have described various factors that can be used in managing the state of the radio systems 210 in the wireless communication device 200 and in managing the selection of a specific communication link.

In additional embodiments, various combinations of all of the factors can be used to achieve optimum management of the radio resources with regard to battery power, cost, and user preferences. For example the wake-up interval can be set to be different at different times of the day and at different locations of the device and may also depend on which applications are active in the wireless communication device 200.

Similarly the wake-up interval may depend on the past success in establishing a radio connection in a particular location. For example, if the wireless communication device 200 has tried a few times to find an available access point for a Wi-Fi connection in a particular location and failed, the radio manager 250 may make the wake-up interval longer in that location to avoid unnecessary attempts. For example the wake-up interval for that location may be made to be a day or several days so that the radio manager 250 will catch a possible addition of a new access point that may be made available, but will not waste resources in trying to connect frequently in places where no connection has been available before. Access points may be available for a particular device because they do not have a password protection or access control gateways controlling access to the Internet, because the password has been stored in the memory of the wireless communication device or because they can be accessed through a bandwidth exchange.

Similar, other, complex combinations of variables may be utilized to precisely tune the management of the state of the radios and connection selections to achieve optimal battery savings and cost savings.

The above description of the disclosed embodiments is provided to enable any person skilled in the art to make or use the inventions. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter, which is broadly contemplated by the present invention. It is further understood that the scope of the present invention fully encompasses other embodiments that may become obvious to those skilled in the art.

Those of skill will appreciate that the various illustrative functional blocks, modules, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the design constraints imposed on the overall system. Skilled persons can implement the described functionality in varying ways for each particular application, but such implementation decisions should not be interpreted as causing a departure from the scope of the invention. In addition, the grouping of functions within a module, block or step is for ease of description. Specific functions or steps can be moved from one module or block without departing from the invention.

The various illustrative functional blocks and modules described in connection with the embodiments disclosed herein can be implemented or performed with a general purpose processor, a digital signal processor (DSP), application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

What is claimed is:

1. A method for managing a radio of a wireless communication device, the method comprising:
   storing a last action of a user related to an operation state of the radio;
   monitoring a display of the wireless communication device;
   in response to the display changing from an inactive state to an active state while the radio is off and the last action of the user to be stored was turning the radio on, turning the radio on; and,
   in response to the display changing from the active state to the inactive state while the radio is on and the last action of the user to be stored was turning the radio on,
      determining whether a radio connection has been established that is adequate to provide data traffic,
      when an adequate radio connection is determined to have been established, leaving the radio on, and,
      when an adequate radio connection is not determined to have been established,
         turning the radio off,
         upon expiration of each of one or more wake up intervals, until and unless an adequate radio connection is established turning the radio on to check for an adequate radio connection, and,
         when an adequate radio connection is established, leaving the radio on.

2. The method of claim 1, comprising, after turning the radio on in response to the display changing from the inactive state to the active state while the radio is off and the last action of the user to be stored was turning the radio on, leaving the radio on until the display changes from the active state to the inactive state.

3. The method of claim 1, wherein determining whether or not the radio connection has been established that is adequate to provide data traffic comprises accounting for costs associated with the radio connection.

4. The method of claim 1, further comprising, in response to the display changing from the active state to the inactive state while the radio is off and the last action of the user to be stored was turning the radio off, turning the radio on to check for an adequate radio connection.

5. The method of claim 4, further comprising, in response to the display changing from the active state to the inactive state while the radio is on with an adequate radio connection established and the last action of the user to be stored was turning the radio off, leaving the radio on.

6. The method of claim 5, further comprising, in response to the display changing from the active state to the inactive state while the radio is on without an adequate radio connection established and the last action of the user to be stored was turning the radio off:
   turning the radio off;
   upon expiration of each of one or more wake up intervals, until and unless an adequate radio connection is established, turning the radio on to check for an adequate radio connection; and,
   when an adequate radio connection is established, leaving the radio on.

7. The method of claim 6, further comprising, in response to the display changing from the inactive state to the active state while the radio is on and the last action of the user to be stored was turning the radio off:
   determining whether an adequate radio connection has been established;
   when an adequate radio connection is determined to have been established, leaving the radio on; and,
   when an adequate radio connection is not determined to have been established, turning the radio off.

8. The method of claim 6, further comprising, in response to the display changing from the inactive state to the active state while the radio is on and the last action of the user to be stored was running the radio off, turning the radio off.

9. A wireless communication device comprising at least one processor that executes the method of claim 1.

10. A method for managing a radio of a wireless communication device, the method comprising:
    storing a last action of a user related to an operation state of the radio;
    monitoring a display of the wireless communication device;
    in response to the display changing from an inactive state to an active state while the radio is on and the last action of the user to be stored was turning the radio off,
       determining whether a radio connection has been established that is adequate to provide data traffic,
       when an adequate radio connection is determined to have been established, leaving the radio, and,
       when an adequate radio connection is not determined to have been established, turning the radio off;
    in response to the display changing from the active state to the inactive state while the radio is off and the last action of the user to be stored was turning the radio off,
       turning the radio on to check for an adequate radio connection,
       when an adequate radio connection is established, leaving the radio on, and,
       when an adequate radio connection cannot be established, turning the radio off,
       upon expiration of each of one or more wake up intervals, until and unless an adequate radio connection is established, turning the radio on, and,
       when an adequate radio connection is established, leaving the radio on.

11. The method of claim 10, further comprising, in response to the display changing from the inactive state to the active state while the radio is off and the last action of the user to be stored was turning the radio on, turning the radio on.

12. The method of claim 11, comprising, after turning the radio on in response to the display changing from the inactive state to the active state while the radio is off and the last action of the user to be stored was turning the radio on, leaving the radio on until the display changes from the active state to the inactive state.

13. The method of claim 10, further comprising, in response to the display changing from the active state to the inactive state while the radio is on and the last action of the user to be stored was turning the radio on, determining whether a radio connection has been established that is adequate to provide data traffic.

14. The method of claim 13, further comprising, when the determination, in response to the display changing from the active state to the inactive state while the radio is on and the last action of the user to be stored was turning the radio on, is that an adequate radio connection has been established, leaving the radio on.

15. The method of claim 13, further comprising, when the determination, in response to the display changing from the active state to the inactive state while the radio is on and the last action of the user to be stored was turning the radio on, is that no adequate radio connection has been established:
    turning the radio off;
    upon expiration of each of one or more wake up intervals, until and unless an adequate radio connection is established, turning the radio on to check for an adequate radio connection; and,
    when an adequate radio connection is established, leaving the radio on.

16. A wireless communication device comprising at least one processor that executes the method of claim 10.

17. A method for managing a radio of a wireless communication device, the method comprising:
    presenting a plurality of radio management modes to a user in a user interface of the wireless communication device, wherein the plurality of radio management modes comprise a maximization mode and an optimization mode;
    receiving a selection of one of the plurality of radio management modes from the user;
    operating the wireless communication device in the selected radio management mode;
    monitoring a display of the wireless communication device;
    while the selected radio management mode is the maximization mode, in response to the display changing from an inactive state to an active state, always turning on the radio; and,
    while the selected radio management mode is the optimization mode,
       storing a last action of a user related to an operation state of the radio,
       in response to the display changing from the inactive state to the active state while the radio is off and the last action of the user to be stored was turning the radio on, turning the radio on, and, in response to the display changing from the active state to the inactive state while the radio is on and the last action of the user to be stored was turning the radio on,
   determining whether a radio connection has been established that is adequate to provide data traffic,
   when an adequate radio connection is determined to have been established, leaving the radio on, and,
   when an adequate radio connection is not determined to have been established,
     turning the radio off,
     upon expiration of each of one or more wake up intervals, until and unless an adequate radio connection is established, turning the radio on to check for an adequate radio connection, and,
     when an adequate radio connection is established, leaving the radio on.

18. The method of claim 17, further comprising, while the selected radio management mode is the optimization mode:
in response to the display changing from an inactive state to an active state while the radio is on and the last action of the user to be stored was turning the radio off,
   determining whether a radio connection has been established that is adequate to provide data traffic,
   when an adequate radio connection is determined to have been established, leaving the radio on, and,
   when an adequate radio connection is not determined to have been established, turning the radio off; and,
in response to the display changing from the active state to the inactive state while the radio is off and the last action of the user to be stored was turning the radio off,
   turning the radio on to check for an adequate radio connection,
   when an adequate radio connection is established, leaving the radio on, and,
   when an adequate radio connection cannot be established,
     turning the radio off,
     upon expiration of each of one or more wake up intervals, until and unless an adequate radio connection is established, turning the radio on, and,
     when an adequate radio connection is established, leaving the radio on.

19. The method of claim 18, wherein the plurality of radio management modes further comprise a disable mode, the wherein the method further comprises, while the selected radio management mode is the disable mode, maintaining the operation state of the radio in accordance with the last action of the user to be stored, regardless of any change in state of the display.

20. A wireless communication device comprising at least one processor that executes the method of claim 17.

\* \* \* \* \*